United States Patent
Goto et al.

(10) Patent No.: US 11,203,243 B2
(45) Date of Patent: Dec. 21, 2021

(54) CONTROL SYSTEM FOR VARIABLE DAMPING FORCE DAMPER

(71) Applicant: HONDA MOTOR CO., LTD., Tokyo (JP)

(72) Inventors: Yuya Goto, Wako (JP); Ryoma Kanda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 72 days.

(21) Appl. No.: 16/673,382

(22) Filed: Nov. 4, 2019

(65) Prior Publication Data

US 2020/0139782 A1   May 7, 2020

(30) Foreign Application Priority Data

Nov. 6, 2018   (JP) .............................. JP2018-208691

(51) Int. Cl.
*B60G 17/016* (2006.01)
*F16F 9/50* (2006.01)

(52) U.S. Cl.
CPC ............ *B60G 17/0162* (2013.01); *F16F 9/50* (2013.01); *B60G 2400/0521* (2013.01); *B60G 2500/10* (2013.01); *B60G 2600/182* (2013.01); *B60G 2800/012* (2013.01); *B60G 2800/912* (2013.01)

(58) Field of Classification Search
CPC .......... B60G 17/0162; B60G 2600/182; B60G 2400/0521; B60G 2800/912; B60G 2500/10; B60G 2800/012; B60G 17/08; B60G 17/06; B60G 17/0157; B60G 17/01908; B60G 17/01933
See application file for complete search history.

(56) References Cited

U.S. PATENT DOCUMENTS 5,096,219 A  *  3/1992  Hanson ................. B60G 17/018
                                                  280/124.106
5,485,377 A  *  1/1996  Sasaki ................. B60G 17/0162
                                                       701/14
5,638,275 A  *  6/1997  Sasaki ................. B60G 17/0152
                                                       701/38

(Continued)

FOREIGN PATENT DOCUMENTS

JP         2015047906 A       3/2015
JP         2016104605 A       6/2016

*Primary Examiner* — Paul N Dickson
*Assistant Examiner* — Timothy Wilhelm
(74) *Attorney, Agent, or Firm* — Armstrong Teasdale LLP

(57) ABSTRACT

A control system for a variable damping force damper, includes: motion state quantity sensors configured to detect motion state quantities of a vehicle; a roll damping force base value setting unit configured to set a roll damping force base value based on the motion state quantities, the roll damping force base value being used to compute a target damping force of the variable damping force damper; a roll rate computation unit configured to compute a sprung mass roll rate and an unsprung mass roll rate of the vehicle based on the motion state quantities; and a roll damping force correction unit configured to correct the roll damping force base value based on a roll rate difference that is a difference between the sprung mass roll rate and the unsprung mass roll rate and to output the corrected roll damping force base value as the target damping force.

4 Claims, 10 Drawing Sheets

(56) References Cited

U.S. PATENT DOCUMENTS

| | | | | |
|---|---|---|---|---|
| 5,642,899 | A * | 7/1997 | Inoue | B60G 17/015 188/266.2 |
| 5,944,763 | A * | 8/1999 | Iwasaki | B60G 17/08 701/37 |
| 7,770,701 | B1 * | 8/2010 | Davis | C10M 171/001 188/267.1 |
| 7,900,938 | B2 * | 3/2011 | Sano | B60G 21/0555 280/5.502 |
| 8,718,872 | B2 * | 5/2014 | Hirao | B60W 30/025 701/38 |
| 9,156,328 | B2 * | 10/2015 | Kikuchi | B60T 7/12 |
| 9,187,090 | B2 * | 11/2015 | Shiozawa | B60W 30/04 |
| 9,278,599 | B2 * | 3/2016 | Hirao | B60G 17/0152 |
| 9,375,990 | B2 * | 6/2016 | Kanda | B60G 17/01933 |
| 9,636,965 | B2 * | 5/2017 | Hirao | B60G 17/015 |
| 9,643,599 | B2 * | 5/2017 | Kikuchi | B60G 17/0185 |
| 10,703,162 | B2 * | 7/2020 | Kanda | B60G 17/0182 |
| 2008/0234896 | A1 * | 9/2008 | Kato | B60G 17/06 701/37 |
| 2008/0249690 | A1 * | 10/2008 | Matsumoto | F16F 15/02 701/48 |
| 2014/0095024 | A1 * | 4/2014 | Hirao | B60G 17/016 701/37 |
| 2017/0267048 | A1 * | 9/2017 | Kubota | B60G 17/08 |
| 2017/0267049 | A1 * | 9/2017 | Kubota | B60G 17/015 |

* cited by examiner

CONTROL SYSTEM FOR VARIABLE DAMPING FORCE DAMPER

TECHNICAL FIELD

The present invention relates to a control system for a variable damping force damper for controlling the roll attitude based on a motion state quantity.

BACKGROUND ART

In recent years, various types of variable damping force dampers, which can vary the damping force in steps or continuously, have been developed for use in suspensions of automobiles. Known mechanisms for varying the damping force include a mechanical type in which the area of an orifice provided in the piston of the damper is varied by a rotary valve and an magnet-rheological fluid (MRF) type in which MRF is used as hydraulic oil and the viscosity of the MRF is controlled by a magnetic fluid valve provided in the piston. In a vehicle equipped with such variable damping force dampers (may be simply referred to as dampers), by variably controlling the damping force of each damper depending on the running state of the vehicle, it is possible to improve the steering stability and the ride comfort.

One known technique to improve the ride comfort is roll control, in which the rolling of the vehicle body is suppressed to optimize the attitude of the vehicle body. In the roll control, in order to suppress the rolling of the vehicle body or sprung mass, the damping force of each damper is controlled such that the larger the roll angular speed (roll rate), lateral acceleration, front-wheel steering angle, etc. of the vehicle body become, the larger the damping force becomes (see JP2015-047906A, for example).

On the other hand, there is known a vehicle control system that performs skyhook control by controlling the braking/driving force produced by electric motors provided for the respective four wheels, without using variable damping force dampers (see JP2016-104605A, for example). The dampers (shock absorbers) used in the control system disclosed in JP2016-104605A have a constant damping coefficient, and thus, the damping force generated by each damper for a given stroke speed is not variable. Each electric motor is controlled to generate a target torque that is a sum of a target driving torque for driving and a target torque for damping vibration. The target torque for damping vibration is determined based on a target vertical force for damping the vibration of the vehicle, which is obtained as a sum of a first vertical force computed by multiplying a vertical speed of the vehicle body by a first control constant and a second vertical force computed by multiplying a stroke speed of the damper by a second control constant, where the second control constant is set to a negative value such that the second vertical force is proportional to the roll stroke speed and has a direction opposite to an actual damping force produced by the damper. Thus, the vertical force generated by the electric motor includes a force having a direction opposite to an actual damping force produced by the damper, and therefore, an apparent damping force generated by the damper is reduced even though the damper has a constant damping coefficient, whereby the ride comfort is improved in a high frequency region. In an embodiment disclosed in JP2016-104605A, the stroke speed includes a roll stroke speed computed by subtracting a sprung mass roll angular speed from an unsprung mass roll angular speed.

Incidentally, in the roll control using the variable damping force dampers, when the damping force (or the damping coefficient) of the dampers is increased, a roll damping ratio, which is determined in dependence on the damping coefficient, is increased. A roll damping ratio of 1 (one) means critical damping. If the roll damping ratio becomes one or higher, a further increase in the roll damping force is not effective in suppressing the roll vibration. On the other hand, even in a region where the roll damping ratio is one or higher, an increase in the roll damping force reduces a transient roll response, but since it also slows the roll response, the roll damping force was conventionally controlled to keep the roll damping ratio below one.

However, when a vehicle is turning, not only the sprung mass rolls, but also the unsprung mass rolls due to deflection of the tires, and therefore, when the roll of the unsprung mass is taken into consideration, there is room for further improvement in the roll attitude control of the vehicle in a period from start of steering to a steady turning state.

SUMMARY OF THE INVENTION

In view of such background, a primary object of the present invention is to provide a control system for a variable damping force damper that can suppress the rolling of the vehicle body more effectively.

To achieve the above object, one embodiment of the present invention provides a control system (20) for a variable damping force damper (6), comprising: a motion state quantity sensors (11-16) configured to detect motion state quantities (V, δf) of a vehicle (1); a roll damping force base value setting unit (22) configured to set a roll damping force base value (DFb) based on the motion state quantities, the roll damping force base value being used to compute a target damping force (DFr) of the variable damping force damper (6) for controlling a roll attitude of the vehicle; a roll rate computation unit (23) configured to compute a sprung mass roll rate (ωs) and an unsprung mass roll rate (ωu) of the vehicle based on the motion state quantities (V, δf); and a roll damping force correction unit (24) configured to correct the roll damping force base value (DFb) based on a roll rate difference (Δω) that is a difference between the sprung mass roll rate (ωs) and the unsprung mass roll rate (ωu) and to output the corrected roll damping force base value as the target damping force (DFr).

Thus, by correcting the roll damping force base value based on the roll rate difference and using the corrected roll damping force base value as the target damping force of the variable damping force damper, the rolling of the vehicle body can be suppressed more effectively than when such correction is not made.

Preferably, the roll damping force correction unit (24) is configured to normalize the unsprung mass roll rate (ωu) and the sprung mass roll rate (ωs) relative to each other based on an unsprung mass roll stiffness and a sprung mass roll stiffness and to compute the roll rate difference (Δω) based on absolute values of the normalized unsprung mass roll rate (ωu) and sprung mass roll rate (ωs).

Thereby, the roll rate difference between the sprung mass roll rate and the unsprung mass roll rate can be computed properly.

Preferably, the roll damping force correction unit (24) is configured to correct the roll damping force base value (DFb) to be larger in absolute value than before correction when the unsprung mass roll rate (ωu) is larger in absolute value than the sprung mass roll rate (ωs) after normalization and to correct the roll damping force base value (DFb) to be smaller in absolute value than before correction when the normalized unsprung mass roll rate ($\omega u$) is smaller in absolute value than the sprung mass roll rate ($\omega s$) after normalization.

Thereby, in a situation where the absolute value of the unsprung mass roll rate is large, a damping force exceeding (in absolute value) the damping force corresponding to the critical damping of the sprung mass is generated to advance the phase of the unsprung mass roll rate so that the ground contact load distribution between the left and right wheels (tires) is changed quickly. In addition, in a situation where the absolute value of the unsprung mass roll rate is small, a damping force smaller in absolute value than the damping force corresponding to the critical damping of the sprung mass is generated to advance the phase of the sprung mass roll rate so that the phase difference between the sprung mass roll rate and the unsprung mass roll rate is reduced, which suppresses an increase in the delay of the roll response.

According to another aspect of the present invention, there is provided a control system (20) for a variable damping force damper (6), comprising: motion state quantity sensors (11-16) configured to detect motion state quantities (V, δf) of a vehicle (1); a roll damping force base value setting unit (22) configured to set a roll damping force base value (DFb) based on the motion state quantities, the roll damping force base value being used to compute a target damping force (DFr) of the variable damping force damper (6) for controlling a roll attitude of the vehicle; a roll rate computation unit (23) configured to compute a sprung mass roll rate ($\omega s$) and an unsprung mass roll rate ($\omega u$) of the vehicle based on the motion state quantities (V, δf); and a roll damping force correction unit (24) configured to correct the roll damping force base value (DFb) based on the sprung mass roll rate ($\omega s$) and the unsprung mass roll rate ($\omega u$) and to output the corrected roll damping force base value as the target damping force (DFr), wherein the roll damping force correction unit (24) is configured to correct the roll damping force base value (DFb) so as to be larger in absolute value than before correction when the sprung mass roll rate ($\omega s$) and the unsprung mass roll rate ($\omega u$) are both positive and are increasing in absolute value with time, to correct the roll damping force base value (DFb) so as to be smaller in absolute value than before correction when the sprung mass roll rate ($\omega s$) and the unsprung mass roll rate ($\omega u$) are both positive and decrease in absolute value with time, to correct the roll damping force base value (DFb) so as to be larger in absolute value than before correction when the sprung mass roll rate ($\omega s$) and the unsprung mass roll rate ($\omega u$) are both negative and are increasing in absolute value with time, and to correct the roll damping force base value (DFb) so as to be smaller in absolute value than before correction when the sprung mass roll rate ($\omega s$) and the unsprung mass roll rate ($\omega u$) are both negative and are decreasing in absolute value with time.

This arrangement also can suppress the rolling of the vehicle body more effectively than a conventional arrangement that is not equipped with the above-mentioned roll damping force correction unit.

Thus, according to an embodiment of the present invention, it is possible to provide a control system for a variable damping force damper that can suppress the rolling of the vehicle body more effectively.

DESCRIPTION OF THE PREFERRED EMBODIMENT(S)

In the following, an embodiment of the present invention will be described in detail with reference to the drawings.

Figure 1:
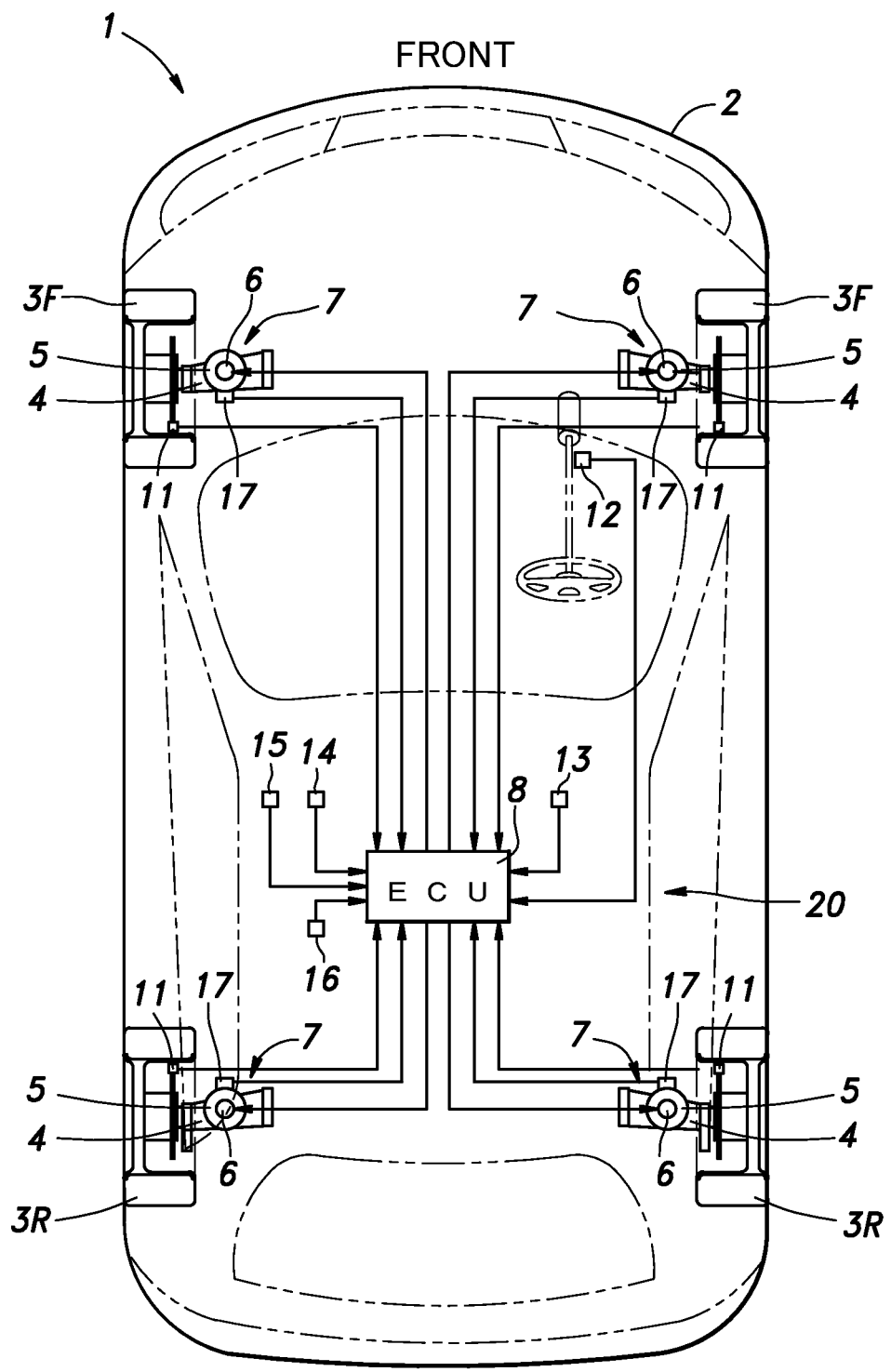
FIG. 1 is a schematic configuration diagram of a vehicle provided with a control system for a variable damping force damper according to an embodiment of the present invention.

FIG. 1 is a schematic configuration diagram of a vehicle 1 provided with a control system 20 for a variable damping force damper according to an embodiment of the present invention. As shown in FIG. 1, the vehicle 1 according to the embodiment is a four-wheeled automobile having left and right wheels 3 (front wheels 3F and rear wheels 3R) installed in a front part and a rear part of a vehicle body 2. The vehicle 1 also has a power source (power plant) for driving the wheels 3 mounted thereon. Each wheel 3 is supported by the vehicle body 2 via a suspension 7 constituted of a suspension arm 4, a spring 5, a variable damping force damper 6 (hereinafter simply referred to as a damper 6), and the like. The power source of the vehicle 1 may include at least one of an internal combustion engine (such as a gasoline engine or a diesel engine) and an electric motor. The vehicle 1 may consist of a front-wheel-drive vehicle in which the driving force is transmitted from the power source to the left and right front wheels 3F. Alternatively, the vehicle 1 may consist of a four-wheel-drive vehicle or a rear-wheel-drive vehicle. The wheels to be steered are the front wheels 3F; namely, the front wheels 3F are steered in response to turning of a steering wheel.

The vehicle 1 includes an Electronic Control Unit (ECU) 8 and various sensors, such as vehicle speed sensors 11, a steering angle sensor 12, a roll rate sensor 13, a pitch rate sensor 14, a lateral acceleration sensor 15, a longitudinal (fore-and-aft) acceleration sensor 16, stroke sensors 17, and the like. The ECU 8 is utilized for various control. The vehicle speed sensors 11 are provided for the respective wheels 3 and output pulse signals generated in accordance with the wheel speeds of the respective wheels 3 to the ECU 8. The steering angle sensor 12 provides the ECU 8 with a signal generated in accordance with a steering wheel angle, which corresponds to a steering angle δf of the front wheels 3F. The roll rate sensor 13 provides the ECU 8 with a signal representing the roll rate ω of the vehicle 1, and the pitch rate sensor 14 provides the ECU 8 with a signal representing the pitch rate ωx of the vehicle 1. The lateral acceleration sensor 15 and the longitudinal acceleration sensor 16 provide the ECU 8 with signals representing the lateral acceleration Gy and the longitudinal (fore-and-aft) acceleration Gx of the vehicle 1, respectively. Each stroke sensor 17 is positioned near the wheelhouse of the corresponding wheel 3 and outputs a signal corresponding to the damper stroke Sd (stroke of the corresponding suspension 7) to the ECU 8. These sensors 11-17 serve as motion state quantity detectors configured to detect motion state quantities of the vehicle 1.

The ECU 8 is constituted of a microcomputer, a ROM, a RAM, peripheral circuits, an input/output interface, various drivers, and the like, and is connected to the dampers 6 of the respective wheels 3 and the sensors 11-17 via a communication line such as a Controller Area Network (CAN). The control system 20 is constituted of the ECU 8, the sensors 11-17, and the like.

The ECU 8 obtains the wheel speeds of the respective wheels 3 based on the signals from the vehicle speed sensors 11 and obtains a vehicle speed V by averaging the wheel speeds. The ECU 8 also obtains the steering angle δf, which is a steering angle of the front wheels 3F, based on the signal from the steering angle sensor 12. Further, the ECU 8 obtains the roll rate ω, the pitch rate ωx, the lateral acceleration Gy, the longitudinal acceleration Gx, and the damper strokes Sd generated in the vehicle 1, based on the signals from the roll rate sensor 13, the pitch rate sensor 14, the lateral acceleration sensor 15, the longitudinal acceleration sensor 16, and the stroke sensors 17.

Each damper 6 includes a cylinder and a piston rod received in the cylinder. A lower end of the cylinder is connected to an upper surface of the suspension arm 4, which may be considered as a wheel-side member. An upper end of the piston rod is connected to a damper base (an upper part of the wheelhouse), which may be considered as a vehicle body-side member. Each damper 6 may have any known structure including a coil for increasing and decreasing the damping force (or damping coefficient), such as an MLV coil or an electromagnetic coil, and increases and decreases the damping force (or damping coefficient) in accordance with the electric current supplied from the ECU 8 to the coil.

In the present disclosure, expressions such as "the damping force becomes larger" or "the damping force is made large" mean that the damping force becomes large or is made greater in absolute value unless otherwise mentioned. Conversely, an expression "the damping force becomes smaller" means that the damping force becomes smaller in absolute value unless otherwise mentioned. On the other hand, expressions such as "the damping force is high" or "the damping force is low" mean that the damping force is large or small in algebraic value. Therefore, for example, when the damping force has a negative value and is made lower, the damping force is made larger (or increased) in absolute value.

Figure 2:
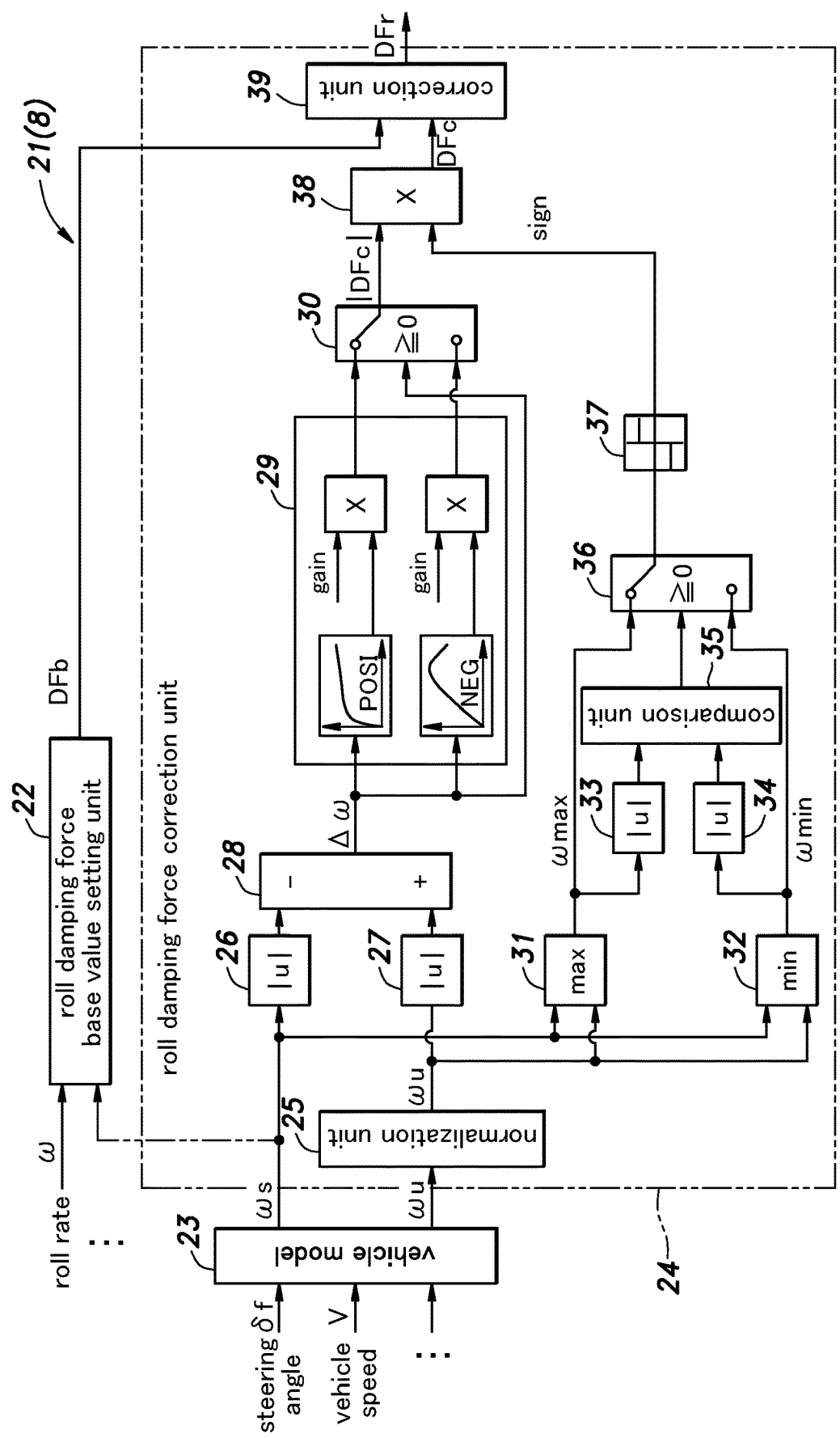
FIG. 2 is a block diagram showing the configuration of the main part of an ECU shown in FIG. 1.

FIG. 2 is a block diagram showing the main part of the ECU 8 shown in FIG. 1. In the following, a detailed description will be made of the damping force control of the dampers 6 performed by the ECU 8 with reference to FIG. 2. It is to be noted that FIG. 2 only shows the main part of the ECU 8, namely, a roll attitude control unit 21 that computes a target damping force (hereinafter referred to as a roll damping force DFr) for suppressing the rolling of the vehicle 1 to optimize the attitude of the vehicle body 2.

Besides the roll attitude control unit 21 shown in FIG. 2, the ECU 8 includes functional units, such as a skyhook control unit, a pitch attitude control unit, and an unsprung vibration control unit. The skyhook control unit computes a damping force for improving the ride comfort through vibration control according to the skyhook theory. The pitch attitude control unit computes a damping force for suppressing the pitching of the vehicle 1 to optimize the attitude of the vehicle body 2. The unsprung vibration control unit computes a damping force for suppressing the vibration of the unsprung mass in the resonance range to improve the grip of the wheels 3 on the road and the ride comfort.

Figure 10:
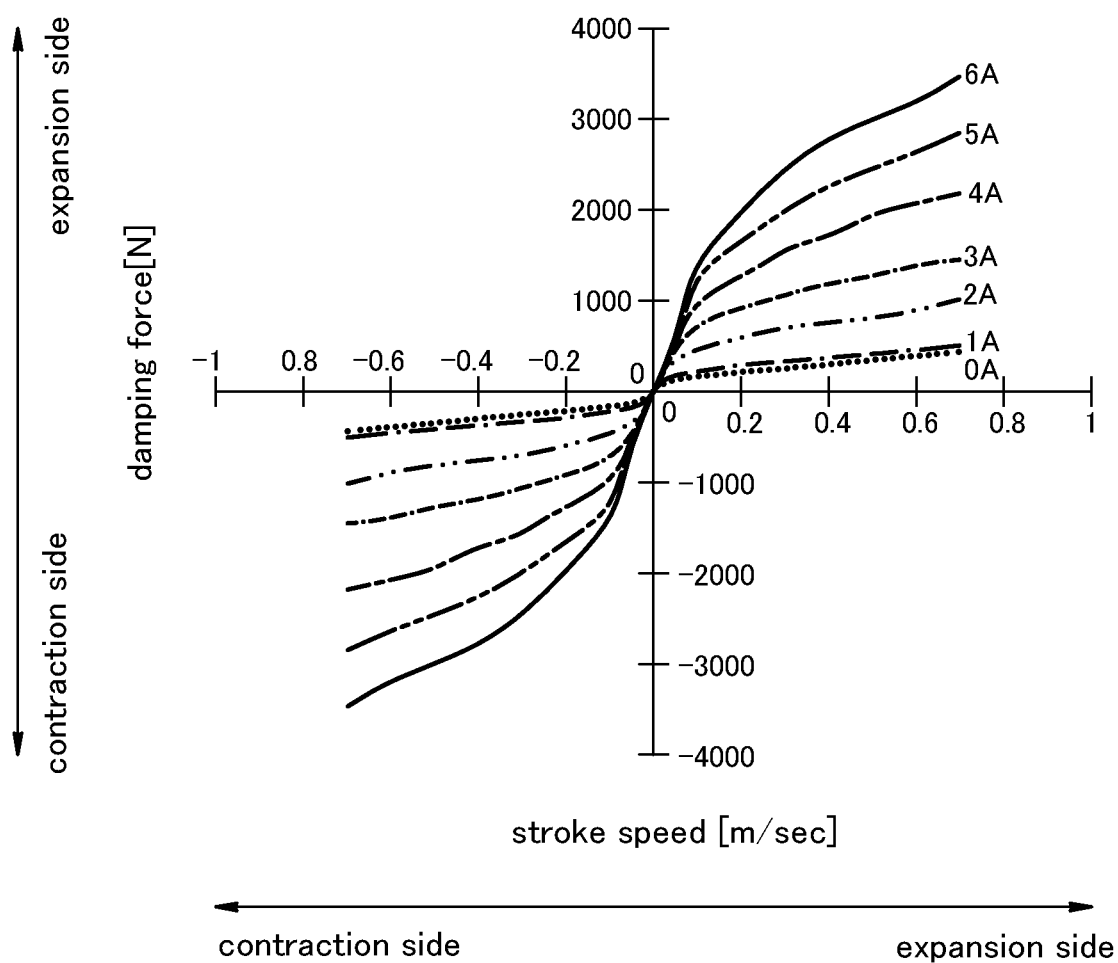
FIG. 10 is an electric current setting map.

Further, the ECU 8 includes an electric current control unit that computes or selects a damping force to be generated for each wheel 3 based on the damping forces computed by the above control units, sets an electric current corresponding to the damping force, and supplies the damper 6 of each wheel 3 with the set electric current. When setting the electric current, the electric current control unit of the ECU 8 may refer to an electric current setting map shown in FIG. 10, for example, to obtain the electric current corresponding to the damping force to be generated from each damper 6 and the stroke speed of the damper 6.

These functional units may be conventional ones, and a detailed description thereof is omitted here.

As shown in FIG. 2, the roll attitude control unit 21 of the ECU 8 includes a roll damping force base value setting unit 22 that sets a base value of the target damping force of the dampers 6 for roll attitude control (hereinafter referred to as a roll damping force base value DFb). The roll damping force base value setting unit 22 sets the roll damping force base value DFb based on the motion state quantities of the vehicle 1, such as the roll rate ω, a differential value of the lateral acceleration Gy, a steering angle speed (differential value of the steering angle δf), the vehicle speed V, and the like (FIG. 2 shows only the roll rate ω as an example of the motion state quantities input to the roll damping force base value setting unit 22). The roll damping force base value setting unit 22 sets the roll damping force base value DFb such that, for example, the larger the roll rate ω becomes, the larger the roll damping force base value DFb becomes, and the smaller the roll rate ω becomes (inclusive of negative values), the smaller the roll damping force base value DFb becomes (inclusive of negative values). The roll rate ω used in the processing performed by the roll damping force base value setting unit 22 may be the one detected by the roll rate sensor 13 or a sprung mass roll rate ωs computed by a later-described vehicle model 23 as shown by an imaginary line. The setting performed by the roll damping force base value setting unit 22 may be the same as that performed in the conventional roll attitude control, and a detailed description thereof is omitted here.

Also, the roll attitude control unit 21 includes a vehicle model 23. The vehicle model 23 functions as a roll rate computation unit that computes the sprung mass roll rate ωs and the unsprung mass roll rate ωu of the vehicle 1 based on the motion state quantities of the vehicle 1, such as the steering angle δf of the front wheels 3F and the vehicle speed V.

The roll attitude control unit 21 further includes a roll damping force correction unit 24 that corrects the roll damping force base value DFb based on a roll rate difference Δω, which is a difference between the sprung mass roll rate ωs and the unsprung mass roll rate ωu.

The roll damping force correction unit 24 will be described in the following, but before that, the purpose of the correction will be described with reference to FIGS. 3 to 8.

Figure 3:
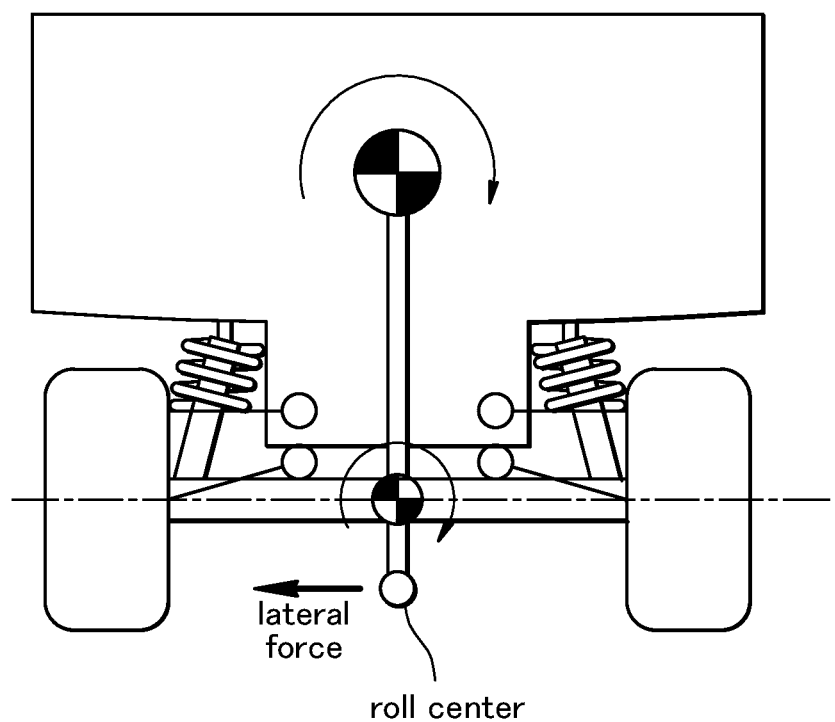
FIG. 3 is a diagram showing a base model of the vehicle shown in FIG. 1.
Figure 4:
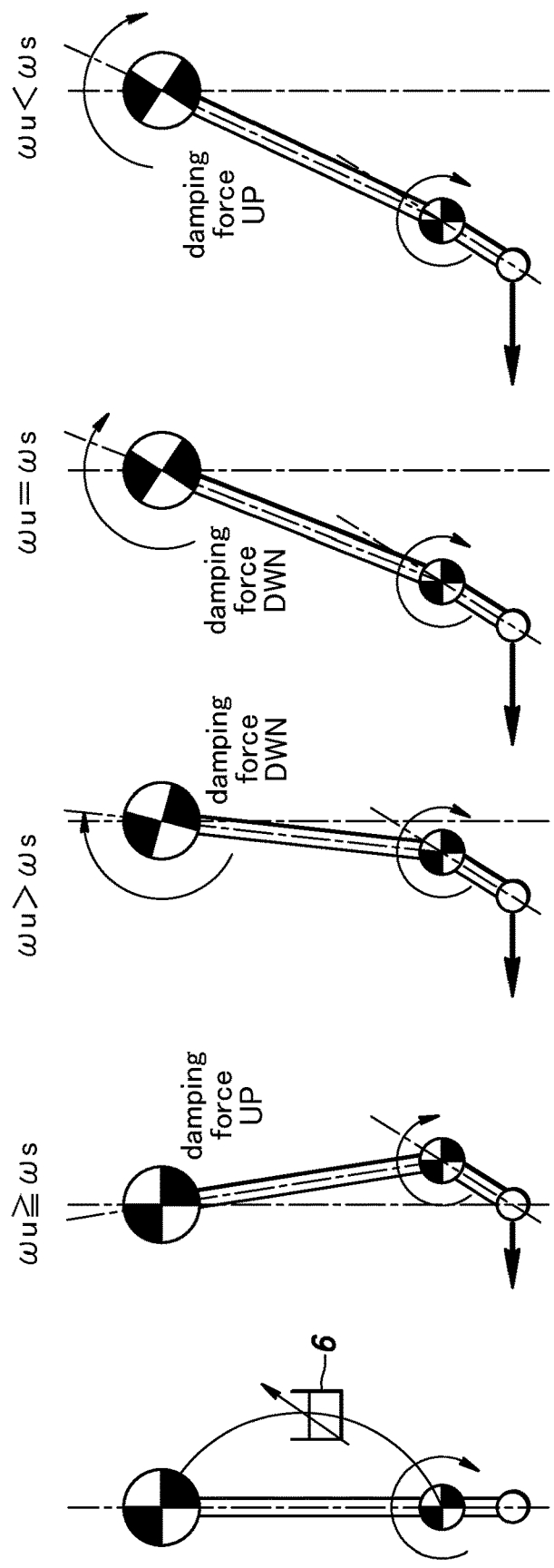
FIG. 4A is a diagram for explaining the roll behavior of the vehicle in a portion of the period from start of steering to a steady turning state.
FIG. 4B is a diagram for explaining the roll behavior of the vehicle in a portion of the period from start of steering to a steady turning state.
FIG. 4C is a diagram for explaining the roll behavior of the vehicle in a portion of the period from start of steering to a steady turning state.
FIG. 4D is a diagram for explaining the roll behavior of the vehicle in a portion of the period from start of steering to a steady turning state.
FIG. 4E is a diagram for explaining the roll behavior of the vehicle in a portion of the period from start of steering to a steady turning state.

FIG. 3 is a diagram showing a base model of the vehicle 1 shown in FIG. 1. As shown in FIG. 3, when the vehicle 1 turns, the wheels 3 generate a lateral force to produce a lateral acceleration Gy, and this causes the vehicle 1 to roll in a direction opposite to the direction of the lateral acceleration Gy. The rolling of the vehicle 1 is caused by a rotational motion around the center of gravity of the sprung mass which can move relative to the unsprung mass in accordance with the stokes of the suspensions 7, and a rotational motion around the center of gravity of the unsprung mass which can move relative to the road surface due to deflection of the tires. Namely, the roll motion of the vehicle 1 can be considered a rotation-vibration motion of a 2-degree-of-freedom (DOF) pendulum, consisting of a rotation around the center of gravity of the unsprung mass and a rotation around the center of gravity of the sprung mass caused by a lateral force applied to a roll center, which is a point on the road surface located at a center between the left and right wheels 3.

FIGS. 4A-4E are diagrams for explaining the roll behavior of the vehicle 1 in a period from start of steering to a steady turning state. A roll of the vehicle 1 considered as a rotation-vibration motion of a 2-DOF pendulum proceeds as follows. When the vehicle 1 is traveling straight, as shown in FIG. 4A, the center of gravity of the unsprung mass and the center of gravity of the sprung mass are located directly above the roll center. When the front wheels 3F are steered to the left in response to turning of the steering wheel, a roll of the unsprung mass occurs first, as shown in FIG. 4B. Namely, the absolute value of the unsprung mass roll rate ωu becomes larger than the absolute value of the sprung mass roll rate ωs. Thereafter, as shown in FIG. 4C, a sprung mass roll occurs after a delay from the occurrence of the unsprung mass roll. At this time, the absolute value of the unsprung mass roll rate ωu is larger than the absolute value of the sprung mass roll rate ωs but the difference becomes smaller. Subsequently, as the sprung mass roll proceeds, the unsprung mass roll rate ωu and the sprung mass roll rate ωs come to coincide with each other, as shown in FIG. 4D. Thereafter, the absolute value of the unsprung mass roll rate ωu decreases such that the absolute value of the sprung mass roll rate ωs becomes larger than the absolute value of the unsprung mass roll rate ωu, as shown in FIG. 4E.

Figure 5:
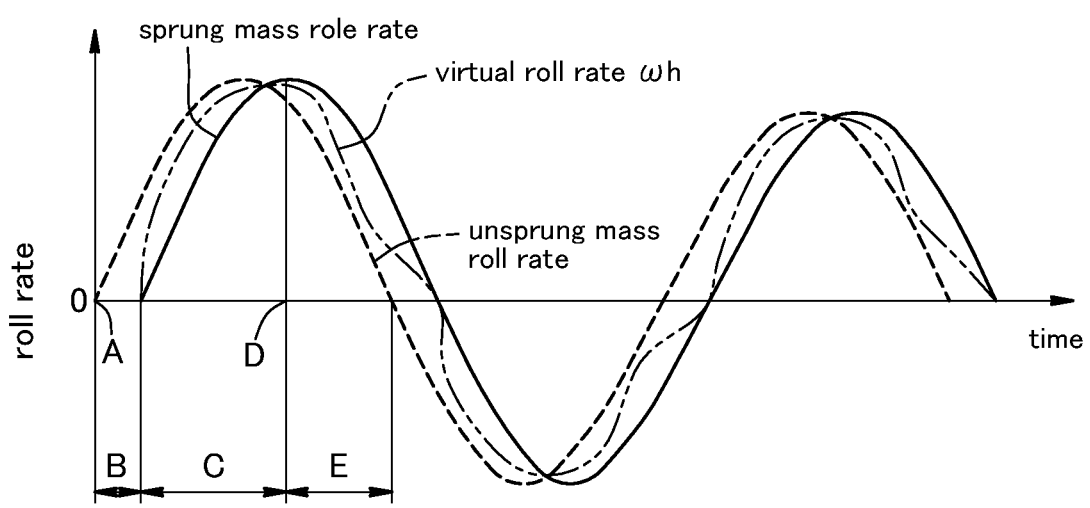
FIG. 5 is a time chart showing a sprung mass roll rate and an unsprung mass roll rate.

FIG. 5 is a time chart showing the sprung mass roll rate ωs and the unsprung mass roll rate ωu of the vehicle 1. In this time chart, the unsprung mass roll rate ωu and the sprung mass roll rate ωs when the vehicle 1 drives in a zigzag pattern are shown. It is to be noted that because the roll stiffness of the unsprung mass is higher than the roll stiffness of the sprung mass, the amplitudes of the unsprung mass roll angle φu and the unsprung mass roll rate ωu are smaller than the amplitudes of the sprung mass roll angle φs and the sprung mass roll rate ωs, respectively. In FIG. 5, the unsprung mass roll rate ωu is normalized by being multiplied with the ratio of the unsprung mass roll stiffness to the sprung mass roll stiffness. Thereby, the maximum value and the minimum value of the unsprung mass roll rate ωu are substantially the same as the maximum value and the minimum value of the sprung mass roll rate ωs in FIG. 5.

As a result of the above-described roll behavior of the vehicle 1, the unsprung mass roll rate ωu is advanced relative to the sprung mass roll rate ωs by a prescribed phase difference, as shown in FIG. 5. The states explained with reference to FIGS. 4A-4E correspond to the time points or periods indicated by reference signs A-E in the time chart of FIG. 5. The phase difference depends on damping characteristics. Specifically, in the case of high damping (or a large damping coefficient), the phase of the unsprung mass roll is advanced while the phase of the sprung mass roll is delayed, resulting in a relatively large phase difference. Conversely, in the case of low damping (or a small damping coefficient), the phase of the unsprung mass roll is delayed while the phase of the sprung mass roll is advanced, resulting in a relatively small phase difference.

Figure 6:
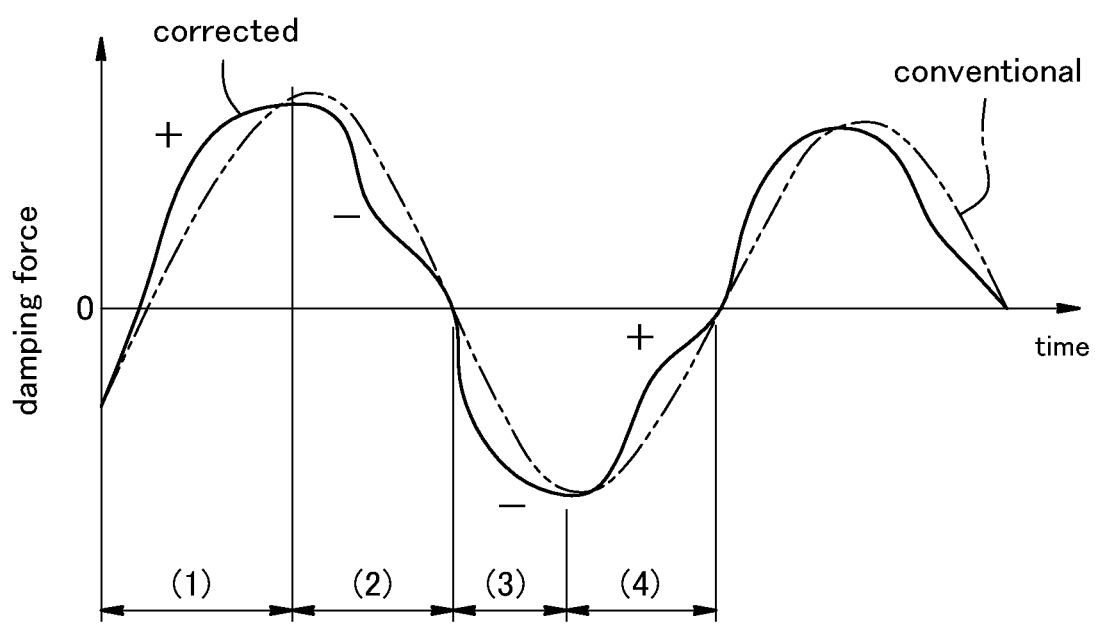
FIG. 6 is a time chart showing a desirable damping force in comparison with a conventional damping force.

FIG. 6 is a time chart showing a desirable damping force in comparison with a conventional damping force. In the conventional roll control, the target damping force of each damper 6 was set substantially based on the motion state quantities of the sprung mass, such as the sprung mass roll rate ωs (or the roll rate ω, which is substantially the same as the sprung mass roll rate ωs), a differential value of the lateral acceleration Gy, and the like. Therefore, as shown by an imaginary line in FIG. 6, the target damping force to be generated by each damper 6 was set to a value corresponding to the motion state quantities of the sprung mass (sprung mass roll rate ωs in the example shown in FIG. 5), and the electric current was supplied to the damper 6 such that this target damping force was generated. That is, the target damping force shown by the imaginary line in FIG. 6 was set in a range that did not cause the roll damping ratio to exceed 1 (one) so that the delay in the phase of the sprung mass roll did not become large.

However, in a period (1) in FIG. 6 (corresponding to the state shown in FIG. 4B), it is possible to rapidly change the ground contact load distribution between the left and right wheels (tires) by increasing the damping force (in absolute value) to advance the unsprung mass roll. In a period (2) in FIG. 6 (corresponding to the states shown in FIGS. 4C and 4D), it is possible to reduce the phase difference between the sprung mass roll rate ωs and the unsprung mass roll rate ωu by decreasing the damping force (in absolute value) to advance the sprung mass roll. Namely, an increase in the delay of the roll response can be suppressed.

Figure 7:
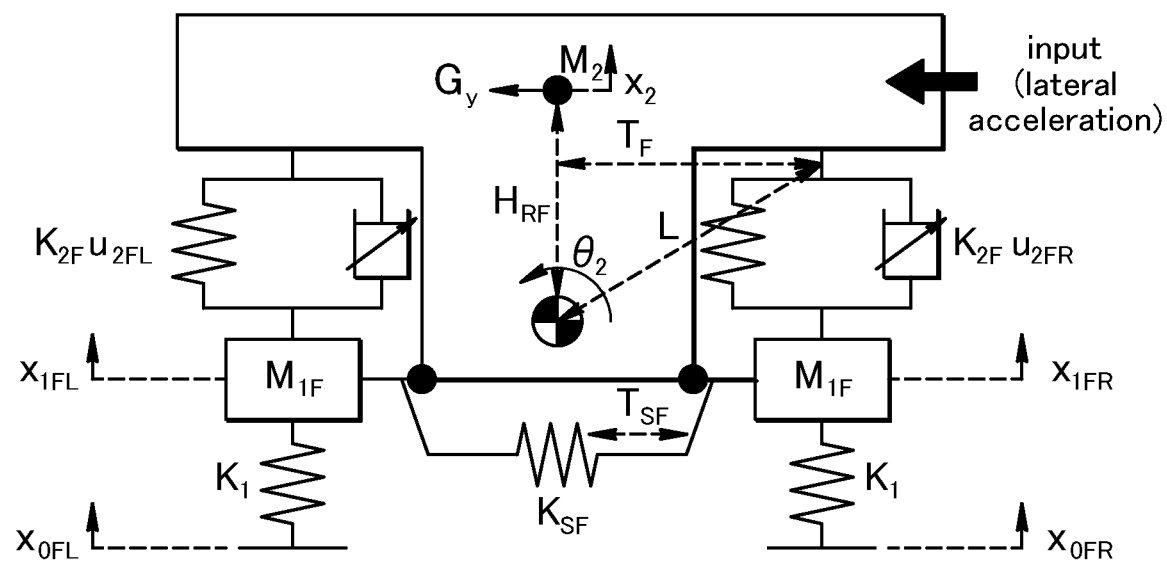
FIG. 7 is a model diagram of the vehicle shown in FIG. 1.
Figure 8:
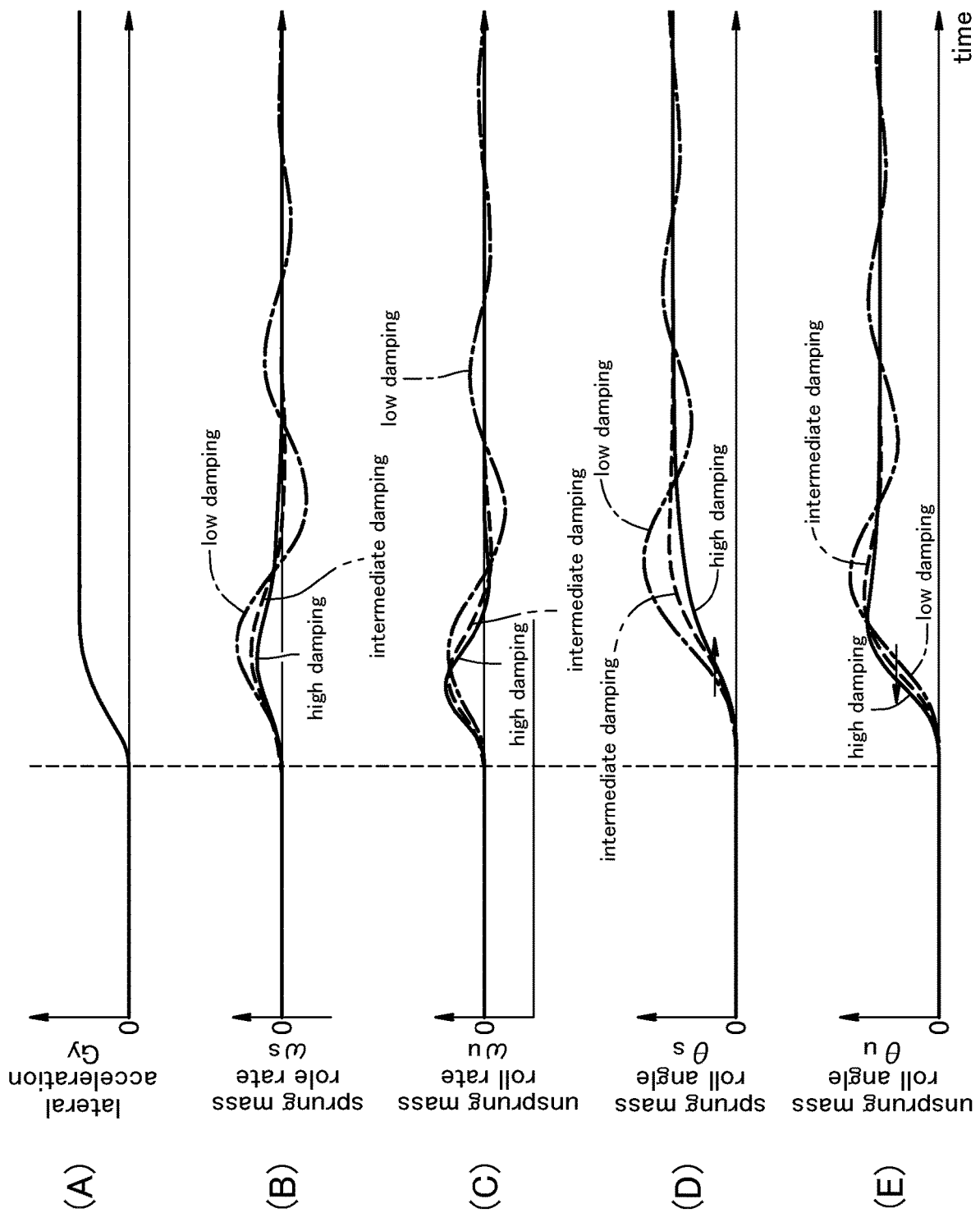
FIG. 8 is a time chart for explaining an influence of a damping force based on the model diagram shown in FIG. 7.

These will be explained concretely below with reference to FIGS. 7 and 8. FIG. 7 is a model diagram of the vehicle 1 shown in FIG. 1, and FIG. 8 is a time chart for explaining an influence of a damping force based on the model diagram shown in FIG. 7. As mentioned above, when not only the roll of the sprung mass but also the roll of the unsprung mass is taken into account, the vehicle 1 can be represented by a 2-DOF pendulum model shown in FIG. 7.

In this model, as shown in (A) of FIG. 8, when the lateral acceleration Gy changes, the sprung mass roll rate ωs, the unsprung mass roll rate ωu, the sprung mass roll angle φs, and the unsprung mass roll angle φu change as shown in (B)-(E) of FIG. 8, respectively. In (B)-(E) of FIG. 8, the behavior of these variables when the dampers 6 are set to generate a relatively large damping force (high damping) is indicated by solid lines, the behavior of these variables when the dampers 6 are set to generate a relatively small damping force (low damping) is indicated by dash-dot lines, and the behavior of these variables when the dampers 6 are set to produce an intermediate damping force (intermediate damping) is indicated by broken lines.

When the dampers 6 are in the high damping state, the phase of the unsprung mass roll rate ωu is advanced (the absolute value thereof increases rapidly) as shown in (C) of FIG. 8 and the phase of the sprung mass roll rate ωs is delayed (the absolute value thereof increases slowly) as shown in (B) of FIG. 8, compared to when the dampers 6 are in the low damping state. Accordingly, when the dampers 6 are in the high damping state, the phase of the unsprung mass roll angle φu is advanced (the absolute value thereof increases rapidly) as shown in (E) of FIG. 8 and the phase of the sprung mass roll angle φs is delayed (the absolute value thereof increases slowly) as shown in (D) of FIG. 8, compared to when the dampers 6 are in the low damping state.

Therefore, by correcting the conventional target damping force of the dampers 6 indicated by the imaginary line in FIG. 6 into a corrected target damping force shown by a solid line in FIG. 6, it is possible to suppress a transient roll behavior without an increase in the delay of the roll response. Specifically, as shown in (1) of FIG. 6, in the period in which the unsprung mass roll rate ωu is larger in absolute value than the sprung mass roll rate ωs (and also larger in algebraic value), the target damping force of the dampers 6 is preferably made larger than the conventional target damping force in absolute value (and also in algebraic value). Also, as shown in (2) of FIG. 6, in the period in which the unsprung mass roll rate ωu is smaller in absolute value than the sprung mass roll rate ωs (and also smaller in algebraic value), the target damping force of the dampers 6 is preferably made smaller than the conventional target damping force in absolute value (also in algebraic value). By thus setting (or correcting) the target damping force of the dampers 6, the roll attitude of the vehicle 1 can be improved in the period from the start of steering to the steady turning state.

Likewise, as shown in (3) FIG. 6, in the period in which the unsprung mass roll rate ωu is larger in absolute value than the sprung mass roll rate ωs (but smaller in algebraic value), the target damping force of the dampers 6 is preferably made larger in absolute value than the conventional target damping force (but smaller in algebraic value). Also, as shown in (4) of FIG. 6, in the period in which the unsprung mass roll rate ωu is smaller in absolute value than the sprung mass roll rate ωs (but larger in algebraic value), the target damping force of the dampers 6 is preferably made smaller in absolute value than the conventional target damping force (but larger in algebraic value). Thereby, the roll attitude of the vehicle 1 can be improved in the period from a steady turning state in one direction to a steady turning state in another direction.

The corrected target damping force described above may be obtained by using a virtual roll rate ωh for damping force computation shown by an imaginary line in FIG. 5. Alternatively, it is also possible to add a correction quantity (which may have positive and negative values) to the target damping force computed in the conventional manner, where the correction quantity is adapted to obtain a target damping force similar to that computed by using the virtual roll rate ωh. This correction quantity has a positive value (the sign is "+") when the unsprung mass roll rate ωu and the sprung mass roll rate ωs are both positive and |ωu|>|ωs| (in a region substantially corresponding to (1) in FIG. 6) and has a negative value (the sign is "−") when the unsprung mass roll rate ωu and the sprung mass roll rate ωs are both positive and |ωu|<|ωs| (in a region substantially corresponding to (2) in FIG. 6). Also, the correction quantity has a negative value when the unsprung mass roll rate ωu and the sprung mass roll rate ωs are both negative and |ωu|>|ωs| (in a region substantially corresponding to (3) in FIG. 6) and has a positive value (the sign is "+") when the unsprung mass roll rate ωu and the sprung mass roll rate ωs are both negative and |ωu|<|ωs| (in a region substantially corresponding to (4) in FIG. 6).

To put it in a different way, the correction quantity is added to the target damping force (or corrects the target damping force) to make the target damping force larger in absolute value in a region where the sprung mass roll rate ωs and the unsprung mass roll rate ωu are both positive and are increasing in absolute value with time or a region where the sprung mass roll rate ωs and the unsprung mass roll rate ωu are both negative and are decreasing in absolute value with time, and to make the target damping force smaller in absolute value in a region where the sprung mass roll rate ωs and the unsprung mass roll rate ωu are both positive and are decreasing in absolute value with time or a region where the sprung mass roll rate ωs and the unsprung mass roll rate ωu are both negative and are decreasing in absolute value with time.

Based on the above idea, the roll damping force correction unit 24 shown in FIG. 2 computes the correction quantity (hereinafter referred to as a damping force correction quantity DFc) and adds the damping force correction quantity DFc to the roll damping force base value DFb to thereby correct the roll damping force base value DFb. The roll damping force correction unit 24 outputs the corrected roll damping force base value DFb as the roll damping force DFr, which serves as a target damping force.

Thus, in the roll attitude control unit 21 of the present embodiment, instead of computing the target damping force by using the virtual roll rate ωh as shown in FIG. 5, the roll damping force base value DFb set by the roll damping force base value setting unit 22 is corrected at the roll damping force correction unit 24 to obtain the damping force correction quantity DFr. Thereby, the roll attitude control unit 21 outputs the roll damping force DFr (target damping force) similar to that computed by using the virtual roll rate ωh (indicated by a solid line FIG. 6).

In another embodiment, the roll attitude control unit 21 may compute the virtual roll rate ωh and compute the target damping force based on the virtual roll rate ωh, which is essentially the same process as correcting the roll damping force base value DFb.

In the following, a concrete process performed by the roll damping force correction unit 24 shown in FIG. 2 will be described.

The unsprung mass roll rate ωu is normalized by a normalization unit 25. Specifically, the normalization unit 25 normalizes the unsprung mass roll rate ωu by multiplying the unsprung mass roll rate ωu by the ratio of the unsprung mass roll stiffness to the sprung mass roll stiffness. This is because the unsprung mass roll rate ωu has a larger amplitude than the sprung mass roll rate ωs owing to the difference in the roll stiffness as mentioned above, and hence, it is necessary to correct the unsprung mass roll rate ωu to have an amplitude comparable to that of the sprung mass roll rate ωs.

The sprung mass roll rate ωs is converted to an absolute value by a first absolute value computation unit 26, and the normalized unsprung mass roll rate ωu is converted to an absolute value by a second absolute value computation unit 27. The absolute value of the sprung mass roll rate ωs and the absolute value of the unsprung mass roll rate ωu are used in the arithmetic processing performed by a difference computation unit 28. The difference computation unit 28 computes the roll rate difference Δω by subtracting the absolute value of the sprung mass roll rate ωs from the absolute value of the unsprung mass roll rate ωu.

Because the unsprung mass roll rate $\omega u$ is normalized based on the ratio of the unsprung mass roll stiffness to the sprung mass roll stiffness as described above, it is possible to properly compute the roll rate difference $\Delta\omega$.

The roll rate difference $\Delta\omega$ is used in the processing performed by a damping force correction quantity computation unit 29 and a first switching unit 30. The damping force correction quantity computation unit 29 refers to a map ("POSI" in FIG. 2) to be used when the roll rate difference $\Delta\omega$ acts to increase the damping force in absolute value ((1) and (3) in FIG. 6) and a map ("NEGA" in FIG. 2) to be used when the roll rate difference $\Delta\omega$ acts to decrease the damping force in absolute value ((2) and (4) in FIG. 6) and multiplies the values obtained by referring to the maps based on the roll rate difference $\Delta\omega$ by respective predetermined gains to compute respective damping force correction quantity absolute values |DFc|. These gains are coefficients for converting the roll rate difference $\Delta\omega$ [rad/s] to a target damping force [N]. The maps are provided for compensating for an electric current instruction delay (a delay in arithmetic processing performed by the ECU 8, a delay from electric current instruction to actual flowing of the electric current, etc.) and a hydraulic response delay (a delay from changing of control current to changing of the damping force). In addition, the maps also serve to provide a dead zone to reduce the influence of noise, to represent the nonlinearity of the conversion coefficients due to nonlinear characteristics of the spring and damping elements.

The first switching unit 30 switches the output thereof between the two damping force correction quantity absolute values |DFc| computed by the damping force correction quantity computation unit 29, based on the sign (positive or negative) of the roll rate difference $\Delta\omega$ such that the damping force correction quantity absolute value |DFc| corresponding to the sign of the roll rate difference $\Delta\omega$ is output.

The sprung mass roll rate $\omega s$ computed by the vehicle model 23 and the unsprung mass roll rate $\omega u$ normalized by the normalization unit 25 are used in the processing performed by a maximum value selection unit 31 and a minimum value selection unit 32. The maximum value selection unit 31 selects a maximum roll rate $\omega max$, which is the maximum value (in algebraic value) of the sprung mass roll rate $\omega s$ and the normalized unsprung mass roll rate $\omega u$, while the minimum value selection unit 32 selects a minimum roll rate $\omega min$, which is the minimum value (in algebraic value) of the sprung mass roll rate $\omega s$ and the normalized unsprung mass roll rate $\omega u$. The maximum roll rate $\omega max$ and the minimum roll rate $\omega min$ are converted to absolute values by a third absolute value computation unit 33 and a fourth absolute value computation unit 34, respectively, and the obtained absolute values are compared by a comparing unit 35 to determine which is larger. The result of comparison by the comparing unit 35, the maximum roll rate $\omega max$, and the minimum roll rate $\omega min$ are used in the processing performed by a second switching unit 36. The second switching unit 36 outputs one of the maximum roll rate $\omega max$ and the minimum roll rate $\omega min$ that has a larger absolute value to a sign setting unit 37, in accordance with the comparison result.

The sign setting unit 37 sets a sign (namely, "+1" or "−1") according to the sign of the one of the maximum roll rate $\omega max$ and the minimum roll rate $\omega min$ selected by the second switching unit 36.

The damping force correction quantity absolute value |DFc| from the first switching unit 30 and the sign from the sign setting unit 37 are multiplied by each other at a multiplication unit 38, and the result of the multiplication is output to a correction unit 39 as the damping force correction quantity DFc. The correction unit 39 is an adder and adds the damping force correction quantity DFc to the roll damping force base value DFb from the roll damping force base value setting unit 22 to correct the roll damping force base value DFb, whereby the roll damping force DFr is computed as the corrected roll damping force base value DFb. The roll damping force DFr is substantially identical with the corrected target damping force in FIG. 6*a* computed by using the virtual roll rate $\omega h$ shown in FIG. 5.

As described above, the roll damping force correction unit 24 corrects the roll damping force base value DFb by using the roll rate difference $\Delta\omega$ that is a difference between the sprung mass roll rate $\omega s$ and the unsprung mass roll rate $\omega u$. Thereby, the rolling of the vehicle body 2 can be suppressed more effectively.

Figure 9:
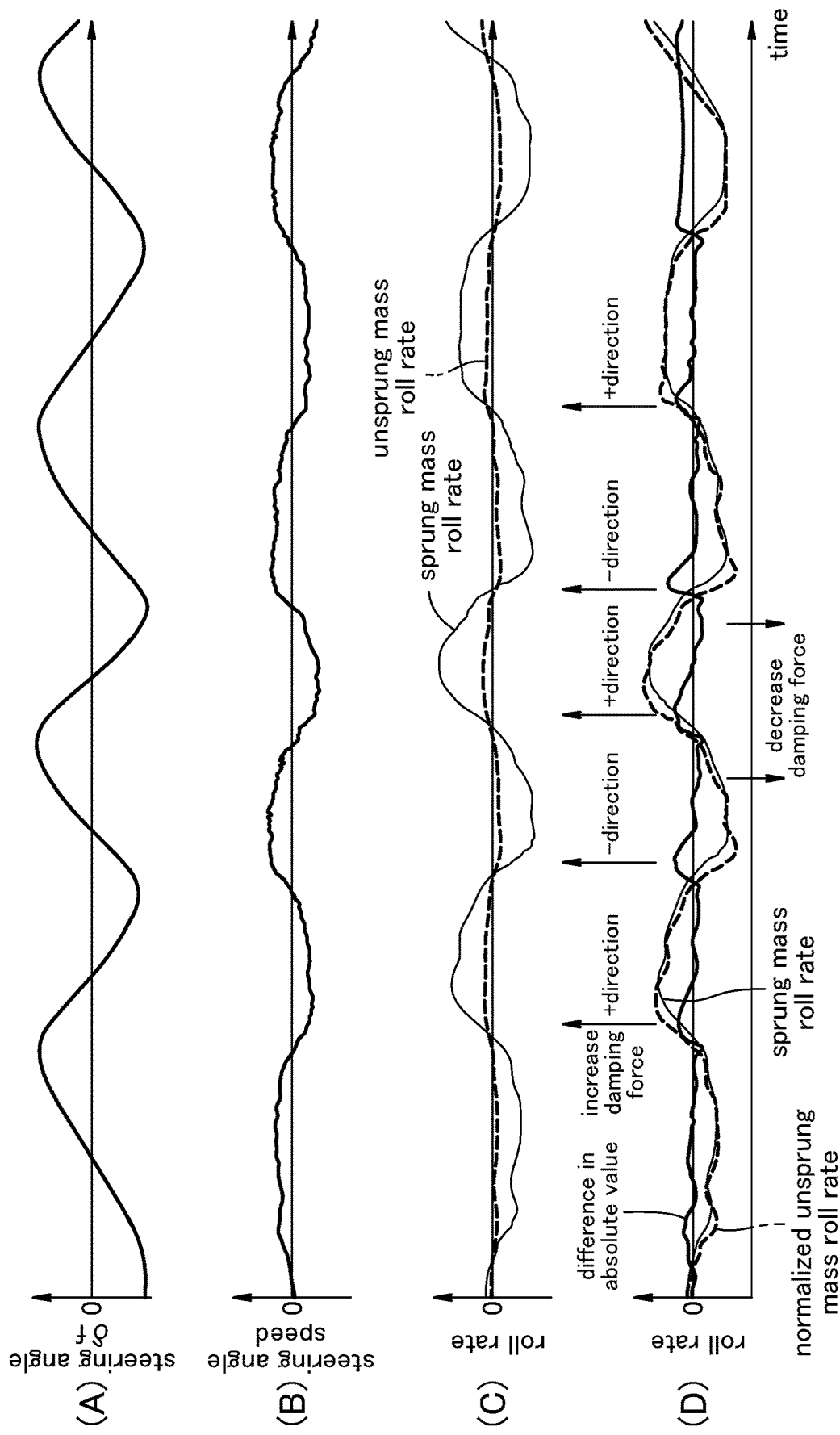
FIG. 9 is a time chart showing the relationship between steering and roll rates regarding the control performed by the control system of the embodiment.

FIG. 9 is a time chart showing the relationship between the steering and the roll rates relating to the control performed by the control system 20 of the embodiment. (A) of FIG. 9 shows the steering angle $\delta f$ of the front wheels 3F, (B) of FIG. 9 shows the steering angle velocity of the front wheels 3F, and (C) and (D) of FIG. 9 show the roll rates. Specifically, (C) of FIG. 9 shows the sprung mass roll rate $\omega s$ by a broken line and the unsprung mass roll rate $\omega u$ before normalization by a thin solid line. (D) of FIG. 9 shows the sprung mass roll rate $\omega s$ by a broken line, the normalized unsprung mass roll rate $\omega u$ by a thin solid line, and the roll rate difference $\Delta\omega$ by a bold solid line.

As shown in (A) and (B) of FIG. 9, the vehicle 1 is driving in a zigzag pattern in which the front wheels 3F are steered left and right alternatingly. At this time, the sprung mass roll rate $\omega s$ and the unsprung mass roll rate $\omega u$ change as shown in (C) of FIG. 9. The unsprung mass roll rate $\omega u$ before normalization is a fraction of the sprung mass roll rate $\omega s$. As shown in (D) of FIG. 9, due to the normalization, the normalized unsprung mass roll rate $\omega u$ has an amplitude comparable to that of the sprung mass roll rate $\omega s$ and occurs earlier than the sprung mass roll rate $\omega s$ by a certain phase difference. As a result, the roll rate difference $\Delta\omega$ is generated.

Because the roll damping force correction unit 24 computes the damping force correction quantity DFc based on the roll rate difference $\Delta\omega$ as described above, when the roll rate difference $\Delta\omega$ has a positive value, the damping force correction quantity DFc is computed to have a sign for increasing the target damping force in absolute value. On the other hand, when the roll rate difference $\Delta\omega$ has a negative value, the damping force correction quantity DFc is computed to have a sign for decreasing the target damping force in absolute value. And, the damping force correction quantity DFc becomes large when the absolute value of the roll rate difference $\Delta\omega$ becomes large. Also, for example, when the roll rate difference $\Delta\omega$ has a positive value and the unsprung mass roll rate $\omega u$ is higher (larger in algebraic value) than the sprung mass roll rate $\omega s$ ((1) in FIG. 6), the damping force correction quantity DFc is computed as a positive value so that the roll damping force base value DFb is corrected to be higher (larger in algebraic value). On the other hand, when the roll rate difference $\Delta\omega$ has a positive value and the unsprung mass roll rate $\omega u$ is lower (smaller in algebraic value) than the sprung mass roll rate $\omega s$ ((3) in FIG. 6), the damping force correction quantity DFc is computed to have a negative value so that the roll damping force base value DFb is corrected to be lower (smaller in algebraic value).

Owing to the above features, as shown in FIG. 6, when the absolute value of the unsprung mass roll rate $\omega u$ becomes large, the roll damping force DFr is computed to have a value exceeding (in absolute value) the roll damping force corresponding to the critical damping of the sprung mass. Also, when the absolute value of the unsprung mass roll rate ωu becomes small, the roll damping force DFr is computed to have a value smaller (in absolute value) than the roll damping force corresponding to the critical damping of the sprung mass. Therefore, when the absolute value of the unsprung mass roll rate ωu becomes large, the unsprung mass roll is advanced, whereby the ground contact load distribution between the left and right wheels (tires) is changed quickly. Further, when the absolute value of the unsprung mass roll rate ωu becomes small, the sprung mass roll is advanced so that the phase difference between the sprung mass roll rate ωs and the unsprung mass roll rate ωu is reduced, whereby an increase in the delay of the roll response is suppressed.

A concrete embodiment of the present invention has been described in the foregoing, but the present invention should not be limited by the foregoing embodiment and various modifications and alterations are possible within the scope of the present invention. The concrete structure, arrangement, number, processing details, etc. of the component parts/units of the embodiment may be appropriately changed within the scope of the present invention. On the other hand, not all of the component parts/units shown in the foregoing embodiments are necessarily indispensable, and they may be selectively used as appropriate.

In the foregoing embodiment, the unsprung mass roll rate ωu was normalized by being multiplied with the ratio of the unsprung mass roll stiffness to the sprung mass roll stiffness. However, it may be also possible to normalize the sprung mass roll rate ωs by multiplying the sprung mass roll rate ωs by the ratio of the sprung mass roll stiffness to the unsprung mass roll stiffness. Namely, the unsprung mass roll rate ωu and the sprung mass roll rate ωs may be preferably normalized relative to each other.

The invention claimed is:

1. A control system for a variable damping force damper, comprising:
   motion state quantity sensors configured to detect motion state quantities of a vehicle;
   a roll damping force base value setting unit configured to set a roll damping force base value based on the motion state quantities, the roll damping force base value being used to compute a target damping force of the variable damping force damper for controlling a roll attitude of the vehicle;
   a roll rate computation unit configured to compute a sprung mass roll rate and an unsprung mass roll rate of the vehicle based on the motion state quantities; and
   a roll damping force correction unit configured to correct the roll damping force base value based on a roll rate difference that is a difference between the sprung mass roll rate and the unsprung mass roll rate and to output the corrected roll damping force base value as the target damping force.

2. The control system according to claim 1, wherein the roll damping force correction unit is configured to normalize the unsprung mass roll rate and the sprung mass roll rate relative to each other based on an unsprung mass roll stiffness and a sprung mass roll stiffness and to compute the roll rate difference based on absolute values of the normalized unsprung mass roll rate and sprung mass roll rate.

3. The control system according to claim 2, wherein the roll damping force correction unit is configured to correct the roll damping force base value so as to be larger in absolute value than before correction when the unsprung mass roll rate is larger in absolute value than the sprung mass roll rate after normalization and to correct the roll damping force base value so as to be smaller in absolute value than before correction when the normalized unsprung mass roll rate is smaller in absolute value than the sprung mass roll rate after normalization.

4. A control system for a variable damping force damper, comprising:
   motion state quantity sensors configured to detect motion state quantities of a vehicle;
   a roll damping force base value setting unit configured to set a roll damping force base value based on the motion state quantities, the roll damping force base value being used to compute a target damping force of the variable damping force damper for controlling a roll attitude of the vehicle;
   a roll rate computation unit configured to compute a sprung mass roll rate and an unsprung mass roll rate of the vehicle based on the motion state quantities; and
   a roll damping force correction unit configured to correct the roll damping force base value based on the sprung mass roll rate and the unsprung mass roll rate and to output the corrected roll damping force base value as the target damping force,
   wherein the roll damping force correction unit is configured
   to correct the roll damping force base value so as to be larger in absolute value than before correction when the sprung mass roll rate and the unsprung mass roll rate are both positive and are increasing in absolute value with time,
   to correct the roll damping force base value so as to be smaller in absolute value than before correction when the sprung mass roll rate and the unsprung mass roll rate are both positive and decrease in absolute value with time,
   to correct the roll damping force base value so as to be larger in absolute value than before correction when the sprung mass roll rate and the unsprung mass roll rate are both negative and are increasing in absolute value with time, and
   to correct the roll damping force base value so as to be smaller in absolute value than before correction when the sprung mass roll rate and the unsprung mass roll rate are both negative and are decreasing in absolute value with time.

* * * * *